(12) United States Patent
Wang et al.

(10) Patent No.: US 8,281,211 B2
(45) Date of Patent: Oct. 2, 2012

(54) SYSTEM AND METHOD FOR RELAY CODING

(75) Inventors: Haifeng Wang, Shanghai (CN); Fang Wang, Nanjing (CN); Ting Zhou, Shanghai (CN); Shixin Cheng, Nanjing (CN)

(73) Assignee: Nokia Corporation, Espoo (FI)

( * ) Notice: Subject to any disclaimer, the term of this patent is extended or adjusted under 35 U.S.C. 154(b) by 1085 days.

(21) Appl. No.: 12/121,631

(22) Filed: May 15, 2008

(65) Prior Publication Data
US 2009/0287979 A1 Nov. 19, 2009

(51) Int. Cl.
H03M 13/00 (2006.01)
(52) U.S. Cl. .................. 714/755; 714/758; 714/790
(58) Field of Classification Search .................. 714/752, 714/755, 758, 790
See application file for complete search history.

(56) References Cited

U.S. PATENT DOCUMENTS

| 6,961,388 | B2 * | 11/2005 | Ling et al. ............. 375/267 |
| 7,200,181 | B2 * | 4/2007 | Kim et al. ............. 375/262 |
| 7,210,092 | B1 * | 4/2007 | Cameron et al. ........ 714/792 |
| 7,421,644 | B2 * | 9/2008 | Mantha et al. .......... 714/800 |
| 7,451,383 | B2 * | 11/2008 | Kim et al. ............. 714/786 |
| 7,523,377 | B2 * | 4/2009 | Halter ................. 714/755 |
| 7,570,700 | B2 * | 8/2009 | Cameron et al. ........ 375/265 |
| 7,660,568 | B2 * | 2/2010 | Sharma et al. ......... 455/277.2 |
| 7,676,732 | B2 * | 3/2010 | Moon et al. ........... 714/774 |
| 7,843,888 | B1 * | 11/2010 | Wang, et al. .......... 370/334 |
| 7,849,377 | B2 * | 12/2010 | Hekstra et al. ........ 714/752 |
| 2006/0291440 | A1 | 12/2006 | Hausl et al. |
| 2007/0116092 | A1 | 5/2007 | Nystrom et al. |

FOREIGN PATENT DOCUMENTS

EP 1 729 435 A1 12/2006
WO WO 2005/060283 A1 6/2005

OTHER PUBLICATIONS

International Search Report and Written Opinion for International Application No. PCT/IB2009/005607 mailed Oct. 7, 2009.
Hausl, C., et al., "Joint Network-Channel Coding for the Multiple-Access Relay Channel", Communications Society on Sensor and Ad Hoc Communications and Networks, 2006, Second '06, 2006 $3^{rd}$ Annual IEEE Communications Society on, vol. 3, Sep. 28, 2006; pp. 817-822.

(Continued)

Primary Examiner — Esaw Abraham
(74) Attorney, Agent, or Firm — Alston & Bird LLP

(57) ABSTRACT

Systems and methods for providing relay in communications systems are disclosed. The relay may receive signals from user equipments (UEs) transmitting coded signals. The relay may receive turbo coded signals from the UEs. The relay station may encode a network channel for transmission to the base station using a recursive systematic convolutional ("RSC") code. The use of RSC for the network code enables the base station to form as well a distributed turbo code as one can with the UE coded signals. In this manner the base station may recover the signal estimates for the UE signals with lower error probability when estimates at the relay station include errors due to imperfect reception. The use of the relay station and the RSC network code enables the base station to receive UE signals with lower error probability even when the transmission path from the UE is imperfect.

16 Claims, 12 Drawing Sheets

OTHER PUBLICATIONS

Woldegebreal, D.H., et al., "Multiple-Access Relay Channel with Network Coding and Non-Ideal Source-Relay Channels", 4$^{th}$ International Symposium on Wireless Communications Systems 2007, ISWCS 2007, Oct. 17-19, 2007, pp. 732-736.

Zang, Z., et al., "Capacity-Approaching Turbo Coding and Iterative Decoding for Relay Channels," IEEE Transactions on Communications, Nov. 2005, pp. 1895-1905, vol. 53, No. 11.

Hausl, C, et al., "Coding for the Multiple-Access Relay Channel," Sep. 28, 2006, Annual IEEE Communications Society on Sensor and Ad Hoc Communications and Networks, vol. 3, pp. 817-822, Reston, VA.

Nguyen, H.T., et al., "A Joint Network-Channel Coding Scheme for Relay-Based Communications," Apr. 2007, IEEE Canadian Conference on Electrical and Computer Engineering, pp. 904-907, Vancouver, Canada.

* cited by examiner

SYSTEM AND METHOD FOR RELAY CODING

TECHNICAL FIELD

The present invention is directed, in general, to communication systems and, more particularly, to a system and method for providing the use of relay functions in a multiple access relay network for a packet-based communication system that includes mobile transceivers and voice and data packet support while allowing for efficient use, simple implementation and conservation of system and mobile station resources.

BACKGROUND

As wireless communication systems such as cellular telephones, satellite, and microwave communication systems become widely deployed and continue to attract a growing number of users, there is a pressing need to accommodate a large and variable number of communication subsystems transmitting a growing volume of data with a fixed resource such as a fixed channel bandwidth accommodating a fixed data packet size. Traditional communication system designs employing a fixed resource (e.g., a fixed data rate for each user) have become challenged to provide high, but flexible, data transmission rates in view of the rapidly growing customer base. Various standards and interoperability requirements are developed on an on-going basis for present and future communications networks. The use of standards ensures that equipment available in the marketplace operates correctly with equipment from a variety of manufacturers and service providers, and in a variety of locales so that to a user carrying the equipment from place to place and even from country to country, the use of the equipment remains convenient and the details of the operations of the network are virtually transparent to the user.

For example, the third Generation Partnership Project Long Term Evolution ("3GPP LTE") is the name generally used to describe an ongoing effort across the industry to improve the Universal Mobile Telecommunications System ("UMTS") for mobile communications. The improvements are being made to cope with continuing new requirements and the growing base of users. Goals of this broad-based project include improving communication efficiency, lowering costs, improving services, making use of new spectrum opportunities, and achieving better integration with other open standards, and backwards compatibility with some existing infrastructure that is compliant with earlier standards. The project envisions a packet-switched communications environment with support for such services as Voice over Internet Protocol ("VoIP") and Multimedia Broadcast/Multicast Service ("MBMS"). MBMS may support services where base stations transmit to multiple user equipment ("UE") simultaneously, such as mobile televisions or radio broadcasts, for example. The 3GPP LTE project is not itself a standard-generating effort, but will result in new recommendations for standards for the UMTS.

The UMTS Terrestrial Radio Access Network ("UTRAN") includes multiple Radio Network Subsystems ("RNS"), each of which contains at least one Radio Network Controller ("RNC"). However, it should be noted that the RNC may not be present in the actual implemented systems incorporating Long Term Evolution ("LTE") or UTRAN ("E-UTRAN"). LTE may include a centralized or decentralized entity for control information. In UTRAN operation, each RNC may be connected to multiple Node Bs, which are the UMTS counterparts to Global System for Mobile Communications ("GSM") base stations. Generally, in this document, a base station ("BS") is one example of a "network entity," but many other devices that can send and receive over-the-air interface of the network are also considered a "network entities," including other UE devices, for example. In E-UTRAN systems, the eNode B may be, or is, connected directly to the access gateway ("aGW," sometimes referred to as the services gateway "sGW"). Each Node B may be in radio contact with multiple UE (generally, user equipment includes mobile transceivers or cellular phones, although other devices such as fixed cellular phones, mobile web browsers, laptops, personal digital assistants ("PDAs"), MP3 players, and gaming devices with transceivers may also be UE)) via the radio Uu interface. In this document, the abbreviation for user equipment ("UE") will be synonymous with the abbreviation for mobile station ("MS"), and MS will be used primarily. Mobile stations may also be cellular phones, PDAs, MP3 players, mobile web browsers, mobile PCs and the like.

The wireless communication systems as described herein are applicable to, as non-limiting examples, existing wireless systems, such as 3G ("3rd Generation mobile communications"), or future systems such as 3GPP LTE compatible wireless communication systems. As a method of improving performance in such systems, use of a relay has been proposed. A network including the relay function is typically referred to as a "multiple access relay network," or as a MARC ("multiple access relay channel"). The relay concept is that in addition to a direct transmission between a mobile station or UE and a network entity such as a base station, a relay may be used that also receives the transmission of the UE and forwards or retransmits the message, or some form of the message, to the network entity. This relay signaling would be particularly significant when a mobile station or UE signal path to a base station is less than would be desired due to obstructions such as buildings, distance, signal noise, the number of other UE in the cell or area, etc; in these situations a relay signal may be used to increase the reception at the base station and hence, the system performance. A relay may be used at any time to increase the accuracy of the reception at the network entity by providing additional signal diversity, or, redundancy. The relay is a station that listens for UE messages transmitted towards the network entity or BS, the relay then transmits a version of the signals forward towards the BS. In this manner, the BS will receive the information, or a form of the information, from the UE in the uplink direction at least twice, once from the UE itself, and once from the relay. Because signal coding operations can remove errors when multiple signals carrying the same information are received (due to signal diversity, or redundancy), when a relay is used in this manner the BS can then eliminate or reduce reception errors that might otherwise occur due to signal noise or distance from the UE.

Coding schemes are used in communications systems. Two types of codes are of particular interest. Because the communications are performed in a relatively noisy (signal noise) environment, error correcting codes are used. Recursive systematic convolutional ("RSC") codes are a common coding scheme. In these codes, a portion of the input is present in the output stream; also, the output is fed back into the convolution, so the code is recursive. In these codes, each m bit information symbols is input into an encoder and transformed into an n bit symbol, where n is greater than or equal to m, the code rate is m/n; and the transformation is a function of the last k information symbols, k is the constraint length of the code.

Recent work has also focused on the turbo codes. Developed in the early 1990s, the turbo codes provide a coding scheme that performs near the theoretical Shannon limit. A turbo code requires two RSC codes and an interleaver. The decoders for turbo coders use a soft decision process, that is, a probability function for each bit is developed based on the likelihood the original bit was a "0" or a "1." Because the decoder uses two decoders and a likelihood or estimate is made by each, an iterative process is used to change the hypotheses until the two decoders come up with the same likelihood estimates for m bits of the data payload, then the process is complete. Turbo coders are used because they provide an error correcting code that provides maximal information transfer over a communications link in the presence of data corrupting noise (for example low signal to noise ratio ("SNR") or high error rate conditions).

As contemplated currently, the relay station in a relay system may simply be a UE with a different or perhaps a better signal path to the base station. The relay may be closer to the base station, or be in a path with less noise, fewer obstructions, etc. In some contemplated system arrangements, a user who allows his MS to act as a relay would receive system credit in exchange for the relay services his MS performs, which would then lower the costs of his own use of the system. In a practical device, the UE would only act as a relay if the device had plenty of charge remaining, and a good path to the BS. This feature could be disabled to conserve or extend battery life, and if the UE was busy transmitting its own data, the relay function would not be available until the device again was idle and had sufficient resources available to act as a relay.

In areas where signaling is known to be problematic due to noise, obstruction or distance to the nearest BS, a dedicated relay device could be used; however, in most scenarios under consideration the relay is simply an additional MS that has resources available to act as a relay. By helping other UE, each user receives a better signal and, if credit is provided, cheaper service when they use the system; and, so all of the users would benefit by having their UE act as relay stations from time to time.

FIG. 1 depicts a simple mobile network including a relay station 13. In FIG. 1, the network entities such as base stations or node B stations 17, NB are operatively coupled together and also coupled to MME/UPE entities 18. A plurality of mobile stations MS/UE are communicating with a base station NB. In addition, a relay station RS is receiving the signals from the mobile stations MS/UE and then relaying the received signals to the base station NB. The base stations are interconnected with an X2 interface or communication link. The base stations are also connected by an S1 interface or communication link to an evolved packet core ("EPC") including, for instance, a mobility management entity ("MME") and a user plane entity ("UPE"), which may form an access gateway ("aGW," a system architecture evolution gateway). The S1 interface supports a multiple entity relationship between the mobility management entities/user plane entities and the base stations and supports a functional split between the mobility management entities and the user plane entities. Note that although two UEs are shown and the relay station RS is receiving signals from two UEs, this illustration is simplified for ease of understanding and in fact many UE signals may be received by the relay and the relay will combine these received signals and relay information to the base station NB.

The actual implementation of such a function in the communications system continues to provide challenges. Several coding schemes have been considered for the relay. In a paper entitled "Joint Network Channel Coding for the Multiple Access Relay Channel", Hausl et al., SECON '06, Vol. 3, September 2006, pp. 817-822, a joint network channel coding scheme, referred to hereafter as "JNCC", is proposed. In this scheme the relay station and the UEs all use a RSC codling scheme. In another paper, entitled "A Joint Network Channel Coding Scheme for Relay Based Communications," Heiu et al, CCECE 2007, April 2007, pp. 904-907, a similar scheme is proposed. In a paper entitled "Capacity Approaching Turbo Coding and Iterative Decoding for Relay Channels," Zhang et al., IEEE Transactions on Communications, Vol. 53, No. 11, 2005, pp. 1895-1905; a system is proposed where the UE, if the link to the relay is less than perfect, use a turbo code at the UE and this could be used to help the relay recover the information; however, only a single UE environment is addressed.

FIG. 2 depicts a simplified view of a JNCC system with a base station BS receiving signals from a user equipment 11, a user equipment 15, and a relay station 13. The relay station 13 also receives transmitted signals from 11 and 15. In FIG. 2, the two UEs referenced as 11 and 15 respectively transmit their information to a network entity, base station 17 with the assistance of relay station 13. In addition, the relay station 13 receives transmissions of both the UEs. Again, although only two UEs are shown transmitting signals received by the relay, many UEs would be transmitting signals received by the relay in a real system.

In FIG. 2, the definitions of the signal links and their corresponding signal to noise ratios ("SNR") are as follows:

$g_{UBi}$: path loss of link from a UE to the base station BS, also referred to as the "direct link"; $SNR_{UBi}$ is its SNR;

$g_{URi}$: path loss of link from a UE to relay; $SNR_{URi}$ is its SNR;

$g_{RB}$: path loss of link from the relay to BS; $SNR_{RB}$ is its SNR.

In the following figures, some definitions are used to depict the coding and transmit operations:

$S_{U,i}$: Systematic bits of UE i after channel coding $P_{U,i}$: Parity bits of UE i after channel coding $P_{UT,i}$: Transmitted parity bits of UE i after channel coding $P_{UP,i}$: Punctured parity bits of UE i after channel coding $S_R$: Systematic bits at relay after network coding $P_R$: Parity bits at relay after network coding FIG. 3 depicts a block diagram of the encoding used in the UE of the JNCC scheme. In FIG. 3, the channel code at the UEs is a recursive systematic convolutional (RSC) code. The network code in the relay is also a RSC code with the same parameters as the RSC code used in UEs. Only the code lengths may be different.

In FIG. 3, symbols $S_{U,j}$ in data stream 35 are input to RSC channel encoder 31, and the output 37 are encoded data symbols $S_{U,j}$ and parity symbols $P_{U,j}$. These symbols are then punctured using standard code puncturing in block 33 and the output 39 are punctured, encoded RSC code symbols and corresponding parity bits.

FIG. 4 depicts the process of a UE in the first time slot, time slot 1. In time slot 1, channel encoder (RSC) (31 in FIG. 3) encodes the systematic bits $S_{U,i}$ into encoded block $[S_{U,i} P_{U,i}]$. After puncturing (block 33 in FIG. 3) only $S_{U,i}$ and $P_{UT,i}$ (39 in FIG. 3) are transmitted. At the same time, the BS 17 and relay 13 listen. Note that these processes of FIG. 3 occur in both UE 11 and UE 15 in FIG. 4.

FIG. 5 depicts the processes of the relay station 13 of FIG. 4 in the JNCC scheme in time slot 2. In time slot 2, it was assumed that the relay station RS can perfectly decode the transmitted information by UEs. At first, the relay station 13 decodes RSC encoded signals 51, 65 received from both UEs 11, 15 and recovers systematic bits $S_{U,i}$ referenced as 55 and 69; the decoding is done by RSC decoders 53, 67 in FIG. 5.

Then the relay 13 interleaves $S_{U,i}$, i=1, 2 together in interleaver 57 into a new long information block 59, which is denoted by $S_R$. After that, the relay station encodes $S_R$ by a RSC code encoder 71 (acting as a network coding), structure of the RSC encoder is the same as in UEs and outputs encoded signals 61, which includes symbols and parity bits. Finally, after puncturing in puncturing block 73, only the newly generated parity bits $P_R$ 64 are transmitted from the relay to the network entity or BS.

FIG. 6 depicts simply the transmission of the parity $P_R$ from the relay station 13 to the BS 17 in time slot 2.

FIG. 7 illustrates, in a block diagram, the iterative network and channel decoder at the BS used in the JNCC scheme.

Some definitions are needed to comprehend the blocks and operations in the FIG. 7:

$y_{UBi}$, i=1, 2: what BS received from a user equipment i in time slot 1;

$y_{RB}$: what BS received from the relay station RS in time slot 2;

$\hat{x}_{UBi}$, i=1, 2: estimated information of user equipment i after decoding at BS;

$L_e^-(u_i)$=i=1, 2: output, the extrinsic information of channel decoder;

$L_e^|(u_i)$=i=1, 2: output, the extrinsic information of network decoder.

The iterative decoder consists of two soft input soft output ("SISO") channel decoders 81, 89 and one SISO network decoder 85. First, the channel decoders 81, 89 calculate extrinsic information $L_e^-(u_i)$, i=1, 2 of user equipment i based on received signal $y_{UBi}$ from UE i. A value of zero is inserted for the punctured bits $P_{UP}$ before decoding. The log-likelihood ratios (LLRs) $L_e^-(u_i)$ are interleaved and mixed in the same way as the interleaving performed in the network encoder at the relay station. The LLRs after the mixture are a priori knowledge for the network decoder.

The network decoder obtains additional information about the parity bits $P_R$ from the relay station by received signal $y_{RB}$ at the BS. The network decoder in the base station of FIG. 7 calculates extrinsic information $L_e^|(u_i)$ i=1, 2 about $S_R$ (which is also $S_U$); this information is fed back to the channel decoders 81 and 89 after de-mixture and de-interleaving by functions 83, 87. After several iterations as indicated by functions 91, 93 and the switch SW1, the channel decoder at BS can combine all the available information from both the relay station and the UEs to obtain the data estimates $\hat{x}_{UBi}$, i=1, 2.

The JNCC scheme illustrates that joint network-channel coding can improve system throughput. Information transmitted from UEs to BS and from the relay station to the BS forms a distributed turbo code, which explores the space diversity gain. In addition, network coding at the relay makes it possible for two UEs to help each other; so that once one of the two UEs is under a bad channel condition, the other UE may help its decoder to recover its original information through network decoder.

The known schemes of the prior art assume that the relay station can recover the UE information perfectly, but in practical communication systems this is often not the case. A continuing need thus exists for an improved coding method and apparatus to provide a robust relay coding scheme when the data estimates at the relay for signals received from the UEs is less than perfect; e.g. when there are estimation errors at the relay station, such as would typically occur in practical communications systems.

SUMMARY

These and other problems are generally solved or circumvented, and technical advantages are generally achieved, by advantageous embodiments of the present invention which include an apparatus and methods according to embodiments for providing a relay coding scheme and apparatus for providing an improved MARC system with user equipments that are mobile stations transmitting coded signals to a base station.

According to an exemplary embodiment, a method for relaying coded signals to a base station is provided, comprising: receiving at the relay a first transmitted signal transmitted to a base station, the transmitted signal being in a first error correcting code format; decoding at the relay the transmitted signal to form a decoded signal; re-encoding the decoded signal into a second error correcting code format; determining from the re-encoded signal a sequence of parity symbols; and transmitting the parity symbols to the base station in the second error correcting code format.

In another exemplary embodiment, the above method is performed and further comprising: receiving at the station a second transmitted signal transmitted to the base station in the first error correcting code format, the second transmitted signal received orthogonally with the first transmitted signal; decoding at the station the first and second transmitted signals to form first and second decoded signals; interleaving the first and second decoded signals; re-encoding the interleaved signals into the second error correcting code format; determining from the re-encoded signal a sequence of parity symbols; and transmitting the parity symbols to the base station in the second error correcting code format.

In another exemplary method, the methods above are performed wherein receiving at the relay station the first and second transmitted signals further comprises receiving turbo coded systematic bits and parity bits.

In another exemplary method, the method above is performed wherein decoding at the station to form first and second decoded signals further comprises performing first and second turbo decoders and performing first and second turbo re-encoder and code puncturing.

In another exemplary method, the above methods are performed wherein re-encoding the interleaved signals comprises performing a recursive systematic convolutional encoding.

In another exemplary method, the above methods are performed wherein determining the parity symbols further comprises performing a code puncturing on the second error format signals.

In another exemplary method, a method for relaying coded signals to a base station is provided, comprising: receiving at a station a first transmitted signal transmitted to a base station, the transmitted signal being in a first error correcting code format; decoding at the station the transmitted signal to form a decoded signal; re-encoding the decoded signal into a second error correcting code format; determining from the re-encoded signal a sequence of parity symbols; and transmitting the parity symbols to the base station in the second error correcting code format; wherein the first error correcting code format is a turbo code.

In another exemplary method, the above method is performed wherein the second error correcting code format is a recursive systematic convolutional code.

In another exemplary method, a method for relaying coded signals to a base station is provided, comprising: receiving at a station a first transmitted signal transmitted to a base station, the transmitted signal being in a first error correcting code format; decoding at the station the transmitted signal to form a decoded signal; re-encoding the decoded signal into a second error correcting code format; determining from the re-encoded signal a sequence of parity symbols; and transmitting the parity symbols to the base station in the second error correcting code format; wherein the station is a relay station.

In another exemplary method, a method for relaying coded signals to a base station is provided, comprising: receiving at a station a plurality of transmitted signals transmitted to a base station, the transmitted signals being in a first error correcting code format; decoding at the station the transmitted signals to form a plurality of decoded signals; re-encoding the decoded signal into a second error correcting code format; determining from the re-encoded signal a sequence of parity symbols; and transmitting the parity symbols to the base station in the second error correcting code format; wherein the station is a relay station.

In another exemplary method, the above method is performed wherein the relay station is a mobile station further operable for transmitting and receiving user data to and from a base station.

In another exemplary method, a method for relaying coded signals to a base station is provided, comprising: receiving at a station a first transmitted signal transmitted to a base station, the transmitted signal being in a first error correcting code format; decoding at the station the transmitted signal to form a decoded signal; re-encoding the decoded signal into a second error correcting code format; determining from the re-encoded signal a sequence of parity symbols; and transmitting the parity symbols to the base station in the second error correcting code format; and further comprising: receiving, at a base station, the transmitted parity symbols in the second error correcting code format; receiving, at the base station, the first transmitted signal in the first error correcting code format; performing a decode operation on the transmitted signal to obtain extrinsic information; performing a decode operation on the transmitted parity symbols to obtain extrinsic information about the parity symbols; performing de-interleaving and de-mixing operations; and forming estimates of the symbols in the first transmitted signals using the extrinsic information and the extrinsic information about the parity symbols in an iterative calculation.

In another exemplary embodiment, a relay station is provided, comprising a first receiver for receiving first signals transmitted to a base station in a first error correcting code format, the signals including encoded systematic symbols and parity symbols a second receiver for receiving second signals transmitted to the base station in the first error format, the second signals including encoded systematic symbols and parity symbols, a first decoder for decoding the received first signals; a second decoder for decoding the received second signals, an interleaver for forming an interleaved signal from the first and second decoded received signals, an encoder for encoding the interleaved signal into an encoded signal in a second error correcting code format, a puncturing operation for determining the parity symbols from the encoded signal; and a transmitter for transmitting the parity symbols to the base station in the second error correcting code format.

In another exemplary embodiment, the above described relay station is provided wherein the relay station further comprises a mobile station transceiver for receiving and transmitting spread spectrum radio frequency communication signals to and from a base station over an air interface using coded signals.

In another exemplary embodiment, the above described relay station is provided wherein the first and second receivers receive spread spectrum radio frequency signals over the air interface.

In another exemplary embodiment, the above described relay station is provided wherein transmission of the parity symbols comprises transmitting the parity symbols as spread spectrum radio frequency signals over an air interface to the base station.

In another exemplary embodiment, the above described relay station is provided wherein the relay station is user equipment for cellular communications. In a further embodiment, the relay station is a cellphone.

In another exemplary embodiment, a relay station is provided comprising: a first receiver for receiving first signals transmitted to a base station in a first error correcting code format, the signals including encoded systematic symbols and parity symbols, a second receiver for receiving second signals transmitted to the base station in the first error format, the second signals including encoded systematic symbols and parity symbols, a first decoder for decoding the received first signals, a second decoder for decoding the received second signals, an interleaver for forming an interleaved signal from the first and second decoded received signals, an encoder for encoding the interleaved signal into an encoded signal in a second error correcting code format, a puncturing operation for determining the parity symbols from the encoded signal, and a transmitter for transmitting the parity symbols to the base station in the second error correcting code format; wherein the first error correcting code is a turbo code.

In another exemplary embodiment, the above described relay station is provided wherein the first and second decoders are turbo code decoders. In another exemplary embodiment the above described relay station is provided wherein the second error correcting code is a recursive systematic convolutional (RSC) code. In yet another exemplary embodiment, the above described relay station is provided wherein the encoder is an RSC encoder.

In another exemplary embodiment, a method of relaying signals to a base station, is provided, comprising: transmitting first coded signals from a first user equipment towards a base station; transmitting second coded signals from a second user equipment towards the base station, receiving the first and second coded signals in a relay station, decoding the first and second coded signals to create first and second decoded signals in the relay station, interleaving the first and second decode signals to create an interleaved signal in the relay station, encoding the interleaved signal in the relay station to create an encoded signal using a different coding scheme, determining parity bits from the encoded signal in the relay station; and transmitting the parity bits from the relay station towards the base station.

In another exemplary embodiment, the above described method is provided wherein the first and second coded signals are turbo coded signals. In another exemplary embodiment, the above described method is provided wherein the encoded signal is encoded using a recursive systematic convolutional (RSC) code. In yet another exemplary embodiment, the above described method is provided and further methods are performed comprising receiving in the base station the first and second coded signals, receiving in the base station the encoded signal; performing a decode operation on the first and second coded signals to obtain extrinsic information, performing a decode operation on the transmitted parity bits to obtain extrinsic information about the parity bits, performing de-interleaving and de-mixing operations on the extrinsic information, and forming estimates of the symbols in the first transmitted signals using the extrinsic information and the extrinsic information about the parity symbols in an iterative calculation. In another exemplary embodiment, the preceding method is performed wherein performing a decode operation on the first and second coded signals comprises performing turbo decoding. In yet another exemplary embodiment, the preceding method is performed wherein performing a decode operation on the parity bits comprises performing soft-output RSC decoding.

In another exemplary embodiment, a computer readable medium is provided containing instructions that, when executed by a programmable processor, perform the method of: receiving a first coded signal coded using a first coding scheme from a first user equipment; receiving a second coded signal coded using the first coding scheme from a second user equipment; decoding the first and second coded signals to create first and second decoded signals; interleaving the first and second decode signals to create an interleaved; encoding the interleaved signal to create an encoded signal using a different coding scheme from the first coding scheme; determining parity bits from the encoded signal; and transmitting the parity bits towards the base station. In another exemplary embodiment, the preceding computer readable medium is provided and further instructions are provided that when executed by a programmable device the instructions further perform decoding the first and second signals using a turbo code decoder.

In another exemplary embodiment, a computer readable medium is provided containing instructions that, when executed by a programmable processor, perform the method of: receiving a first coded signal coded using a first coding scheme from a first user equipment; receiving a second coded signal coded using the first coding scheme from a second user equipment; decoding the first and second coded signals to create first and second decoded signals; interleaving the first and second decode signals to create an interleaved signal; encoding the interleaved signal to create an encoded signal using a different coding scheme from the first coding scheme; determining parity bits from the encoded signal; and transmitting the parity bits towards the base station. In another exemplary embodiment, the preceding computer readable medium is provided and further instructions are provided that when executed by a programmable device the instructions further perform decoding the first and second signals using a turbo code decoder. In another exemplary embodiment, the preceding described computer readable medium further comprises instructions that when executed by a programmable device, further perform encoding using RSC coding.

In another exemplary embodiment, a system is described with relaying signaling, comprising a base station for receiving coded signals transmitted over an air interface; a plurality of user equipments operable for transmitting coded signals to the base station using a first coding scheme; and a relay station operable to receive signals transmitted to the base station by the user equipments and to relay signals to the base station using a second coding scheme; wherein the relay station receives signals transmitted from a first and a second user equipment using the first coding scheme, decodes the signals to form first and second decoded signals, interleaves the first and second decoded signals to form an interleaved signal, encodes the interleaved signal using a second coding scheme, determines parity bits in the interleaved encoded signal, and transmits the parity bits over the air interface to the base station. In another exemplary embodiment, the preceding described system is provided wherein the first coding scheme is a turbo code. In another exemplary embodiment, the preceding described system is provided wherein the second coding scheme is a recursive systematic convolutional (RSC) code.

In another exemplary embodiment, a system is provided with relaying signaling, comprising a base station for receiving coded signals transmitted over an air interface; a plurality of user equipments operable for transmitting coded signals to the base station using a first coding scheme; and a relay station operable to receive signals transmitted to the base station by the user equipments and to relay signals to the base station using a second coding scheme; wherein the relay station receives signals transmitted from a first and a second user equipment using the first coding scheme, decodes the signals to form first and second decoded signals, interleaves the first and second decoded signals to form an interleaved signal, encodes the interleaved signal using a second coding scheme, determines parity bits in the interleaved encoded signal, and transmits the parity bits over the air interface to the base station; wherein the relay station is a user equipment for sending and receiving radio frequency signals to the base station over the air interface.

According to another exemplary embodiment, an apparatus is provided comprising means for receiving a first coded signal transmitted to a base station from a first user equipment using a first coding scheme, means for receiving a second coded signal transmitted to the base station from a second user equipment using the first coding scheme, means for decoding the first and second coded signals to form first and second decoded signals, means for interleaving the first and second decoded signals to form an interleaved signal, means for encoding the interleaved signal using a second coding scheme to form a coded interleaved signal, means for determining the parity bits in the coded interleaved signal, and means for transmitting the parity bits to the base station. In another exemplary embodiment, the preceding described relay station is provided as an integrated circuit. In another exemplary embodiment, the preceding described relay station is provided as a programmable integrated circuit.

According to an exemplary embodiment, a mobile station may act as a relay station to a base station, by receiving a first coded signal transmitted to the base station from a first user equipment using a first coding scheme, receiving a second coded signal transmitted to the base station from a second user equipment using the first coding scheme, decoding the first and second coded signals to form first and second decoded signals, interleaving the first and second decoded signals to form an interleaved signal, encoding the interleaved signal using a second coding scheme to form a coded interleaved signal, determining the parity bits in the coded interleaved signal, and transmitting the parity bits to the base station.

According to another exemplary embodiment, an apparatus is provided comprising means for receiving a first coded signal transmitted using a first coding scheme, means for receiving a second coded signal transmitted using the first coding scheme, means for decoding the first and second coded signals to form first and second decoded signals, means for interleaving the first and second decoded signals to form an interleaved signal, means for encoding the interleaved signal using a second coding scheme, means for determining the parity bits in the coded interleaved signal, and means for transmitting the parity bits. According to another exemplary embodiment, the preceding described apparatus is provided where means for receiving the first coding scheme is a means for receiving turbo coded signals. According to another exemplary embodiment, the preceding apparatus is provided where the means for encoding using a second coding scheme is a means for encoding using a recursive systematic convolutional coding scheme.

In another exemplary embodiment, an integrated circuit is provided comprising a first receiver for receiving a first transmitted signal coded using a first coding scheme, a second receiver for receiving a second transmitted signal coded using the first coding scheme, a first decoder for decoding the first received transmitted signal, a second decoder for decoding the second received transmitted signal, an interleaver for forming an interleaved signal from the first and second decoded signals, an encoder for creating an encoded interleaved signal using a second encoding scheme, a puncturing means for determining parity bits from the encoded signal, and an output for outputting the parity bits.

The foregoing has outlined rather broadly the features and technical advantages of certain exemplary embodiments of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. For example, some of the terms used in the foregoing, the description that follows and the appended claims are chosen with regards to the presently used terms in the relevant art and being used in draft standards presently in work; changes in these terms and abbreviations over time by use in industry and in standard drafting are contemplated and do not change the scope of the inventions disclosed nor limit the scope of the appended claims. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawing, in which.

The drawings are illustrative, presented for aid in comprehension, and are not drawn to scale.

DETAILED DESCRIPTION

In embodiments of the present invention, a novel relay coding method and apparatus are used. In the embodiments, coding is performed assuming that the UE to relay link is imperfect and that the data estimates in the relay include estimation errors as a result. In the embodiments, a turbo coding is performed in the UEs. The relay and the base station continue to use RSC coding as the network coding scheme. In the embodiments, errors in the UE to relay link can be overcome by the use of a turbo channel code at the relay. Additional punctured parity bits transmitted to the base station by the relay in method embodiments of the invention make it possible for the base station to obtain a distributed turbo code. In this manner improved performance in obtaining the resulting UE signals at the base station is achieved.

In other embodiments, the RSC network coding scheme makes it possible for two UEs to assist each other, and also, explores the optimum turbo coding structure for the base station to decode the users' information.

Use of embodiments of the present invention improves the error performance and the transmission rate of the multiple access relay channel system with an imperfect link between then UEs and the relay stations.

Figure 8:
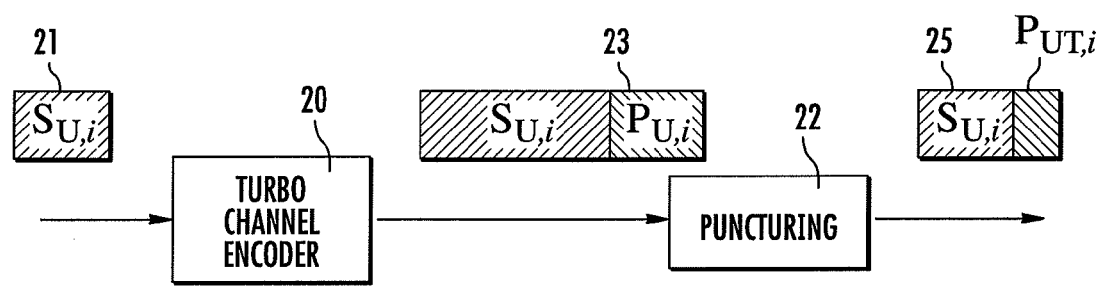
FIG. 8 illustrates in a block diagram the coding and transmission functions performed by a UE in an embodiment of the present invention.

FIG. 8 depicts in block diagram form the coding operations performed by the UE in an embodiment. In FIG. 8, the definitions of signals that are used above are again utilized: (repeated here for convenience)

$S_{U,i}$: Systematic bits of UE i after channel coding
$P_{U,i}$: Parity bits of UE i after channel coding
$P_{UT,i}$: Transmitted parity bits of UE i after channel coding
$P_{UP,i}$: Punctured parity bits of UE i after channel coding
$S_R$: Systematic bits at relay after network coding
$P_R$: Parity bits at relay after network coding Thus in FIG. 8, a UE operation in time slot 1 is shown. In time slot 1, a turbo channel encoder 20 encodes the systematic bits $S_{U,i}$ (referenced as 21) into encoded block $[S_{U,i}\ P_{U,i}]$ (referenced as 23). After puncturing by the operation of block 22, only symbols $S_{U,i}$ and $P_{UT,i}$, shown as block 25, are transmitted to the network entity or base station. At the same time, the BS and relay station listen.

Figure 9:
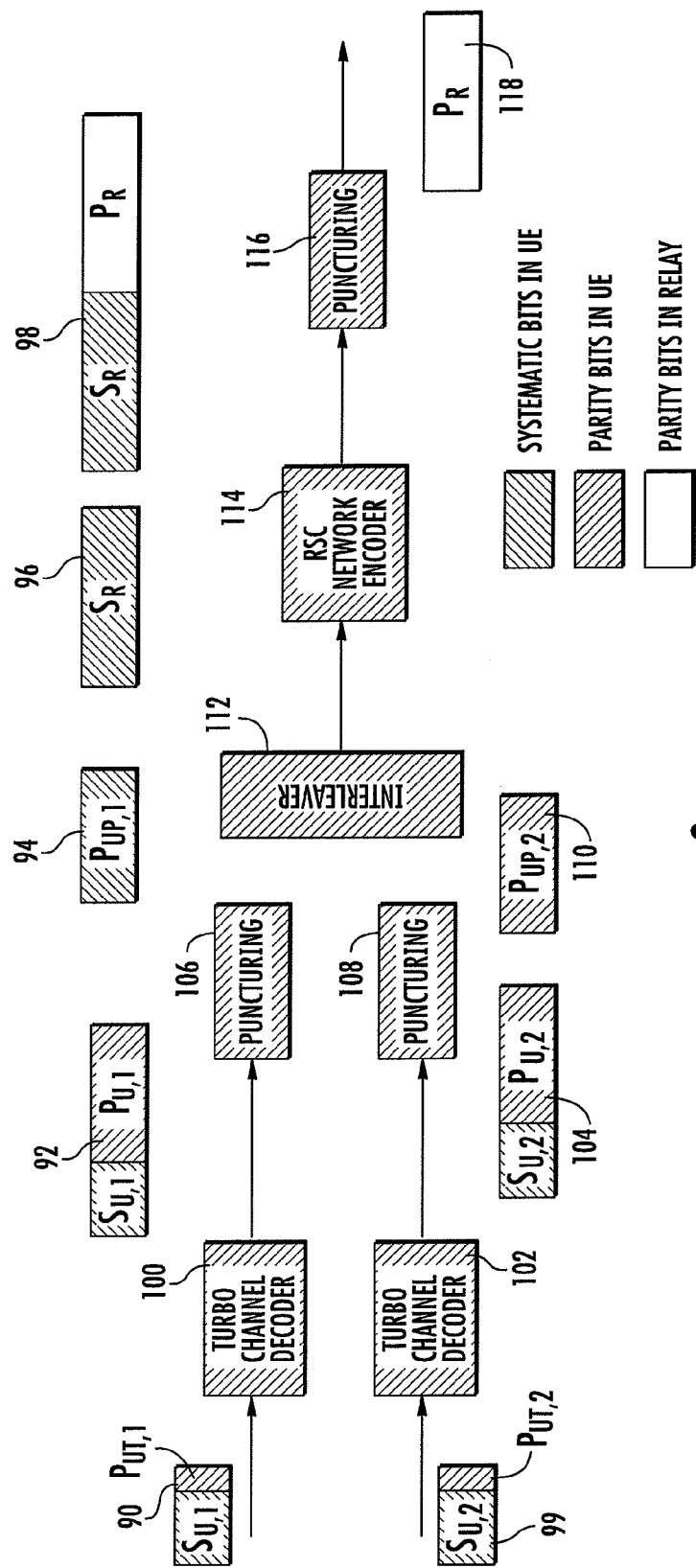
FIG. 9 illustrates in a block diagram the decoding and encoding functions of a relay station in an embodiment of the present invention.

Then in FIG. 9, the time slot 2 operations of the embodiment of a relay station incorporating features of the invention are shown. Here the relay station receives encoded, Turbo coded signals from two UEs, inputs 90 and 99, of course the relay station in a practical system will be communicating with many UEs, or maybe as few as one UE, depending on the environment the relay is operating in. Each received encoded block signal is then decoded by a respective Turbo channel decoder 100, 102 into decoded systematic blocks 92, 104, which include parity. Puncturing operations 106, 108 then output the punctured bits $\hat{P}_{UP}$ for each one of the turbo channel decoders.

The relay station then interleaves (at the block 112) the estimated punctured bits $\hat{P}_{UP}$ (referenced as 94, 110) of (in this non limiting example) both UEs to form a longer information block, which is denoted by $S_R$ (referenced as 96) in FIG. 9. Then the relay station encodes $S_R$ by a RSC network encoder 114 as a network coding. Parameters of this encoder are the same as parameters of the component codes used in turbo code at UEs. After encoding and puncturing by block 116, only the newly generated parity bits $P_R$ (referenced as numeral 118) are transmitted from the relay station Note that the illustrated embodiment of FIG. 9 depicts two decoders, two encoders in the relay. However one skilled in the art will recognize that the two receivers, two decoders, two encoders may be implemented as one resource that is time shared or multiplexed, and the description of first and second receivers, decoders refers to the operation on the second received signal, and does not limit the embodiments to requiring two receivers.

Note also that although in the exemplary embodiments described here, two UEs are transmitting and the relay receives two transmitted signals, this is but one example and many UEs may transmit signals received by and interleaved by the relay. These additional embodiments are contemplated as part of the present invention and within the scope of the appended claims.

Figure 1:
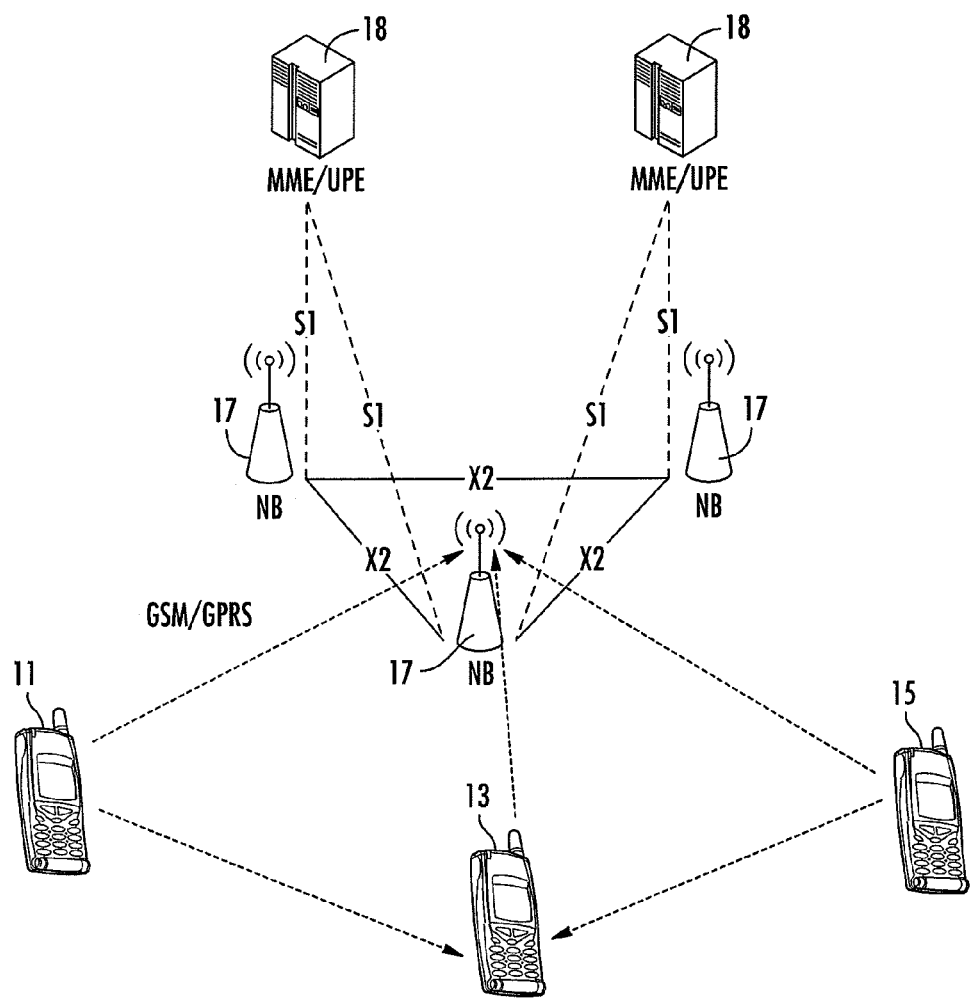
FIG. 1 illustrates a system with mobile stations or user equipment communicating with base stations or node NB stations that are coupled to MMEs in a typical system, UEs and a relay station.
Figure 2:
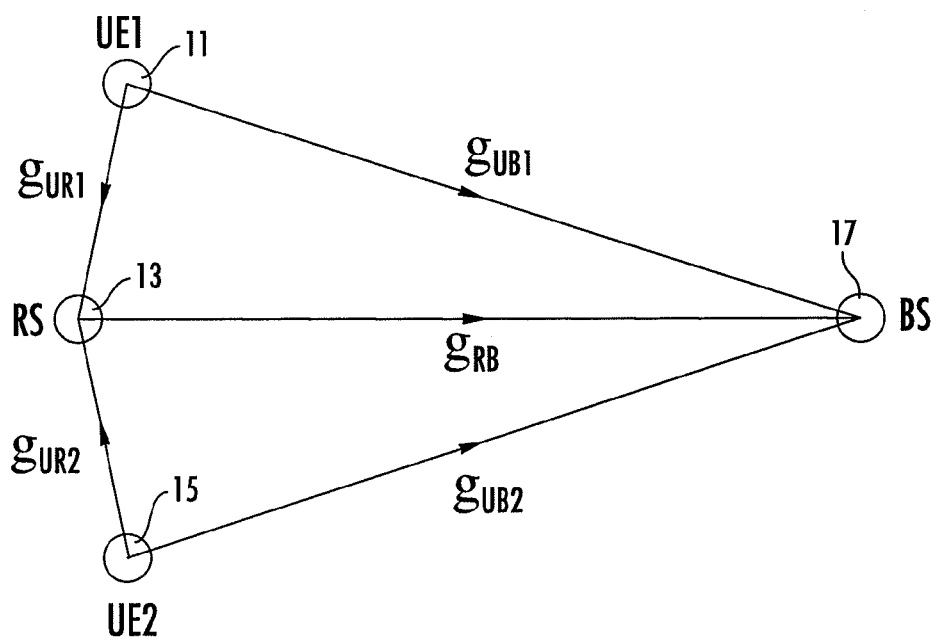
FIG. 2 illustrates in a signal diagram the signals between UEs, a relay station, and a base station.
Figure 3:
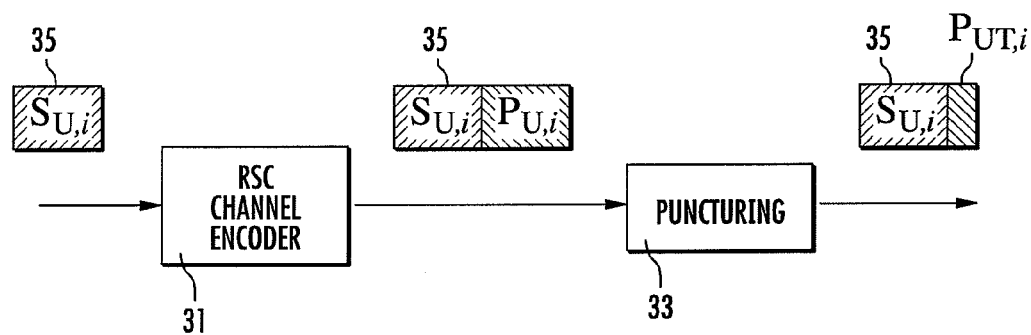
FIG. 3 illustrates in a block diagram the operations of a UE in a prior art coding scheme.
Figure 4:
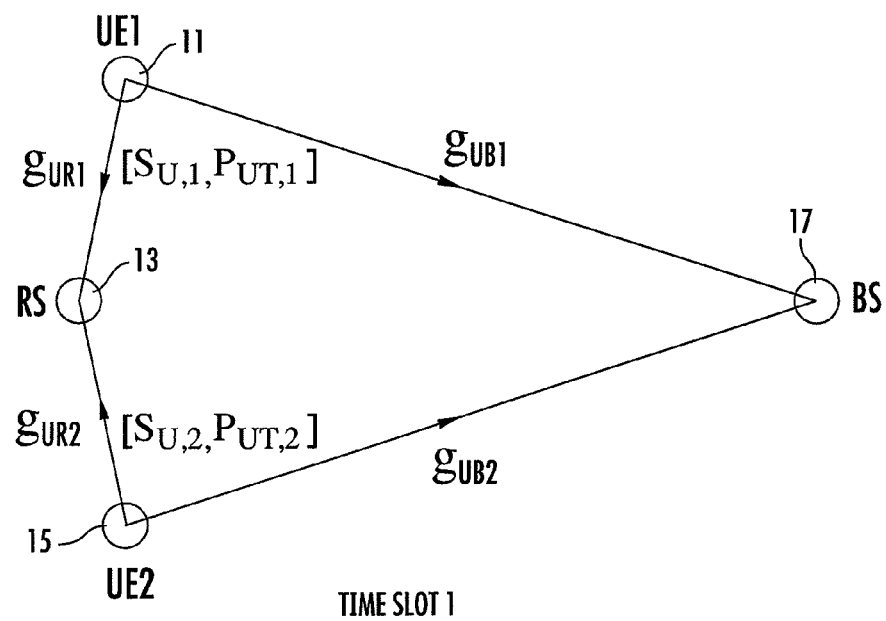
FIG. 4 illustrates in a signal diagram the signaling between UEs and a base station in a first time slot.
Figure 5:
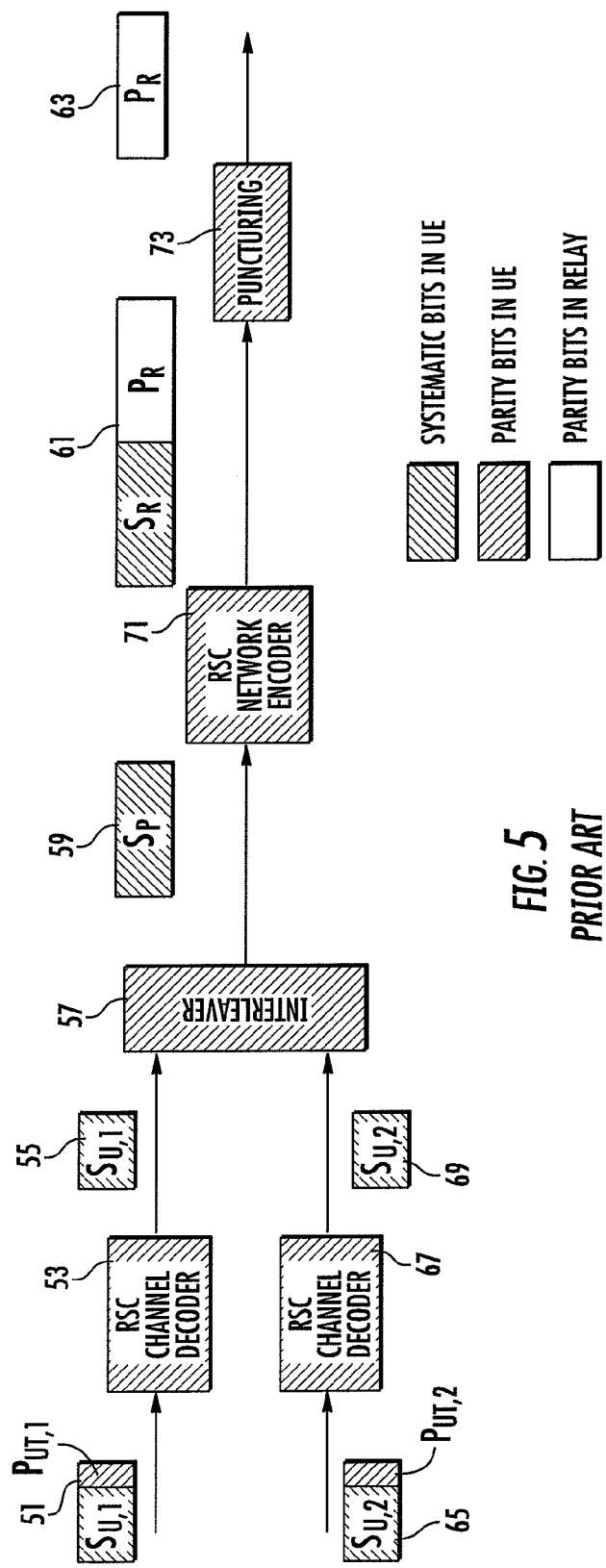
FIG. 5 illustrates in a simplified block diagram the operations of a relay station coding scheme of the prior art.
Figure 6:
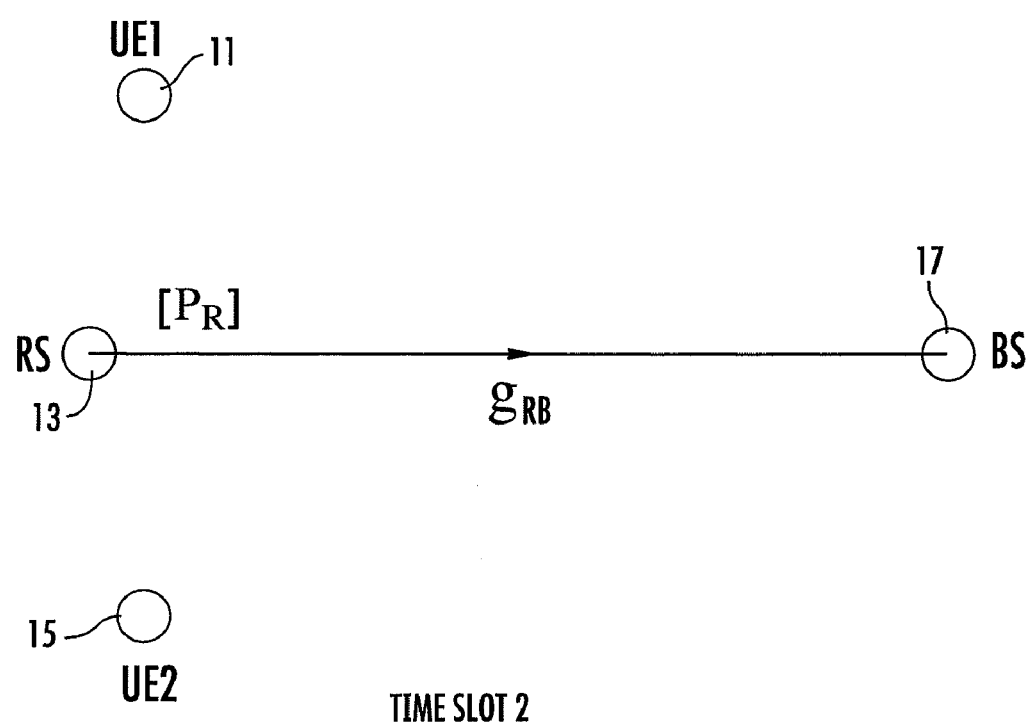
FIG. 6 illustrates in a simplified signal diagram the signals transmitted from a relay station to the base station in a second time slot.
Figure 7:
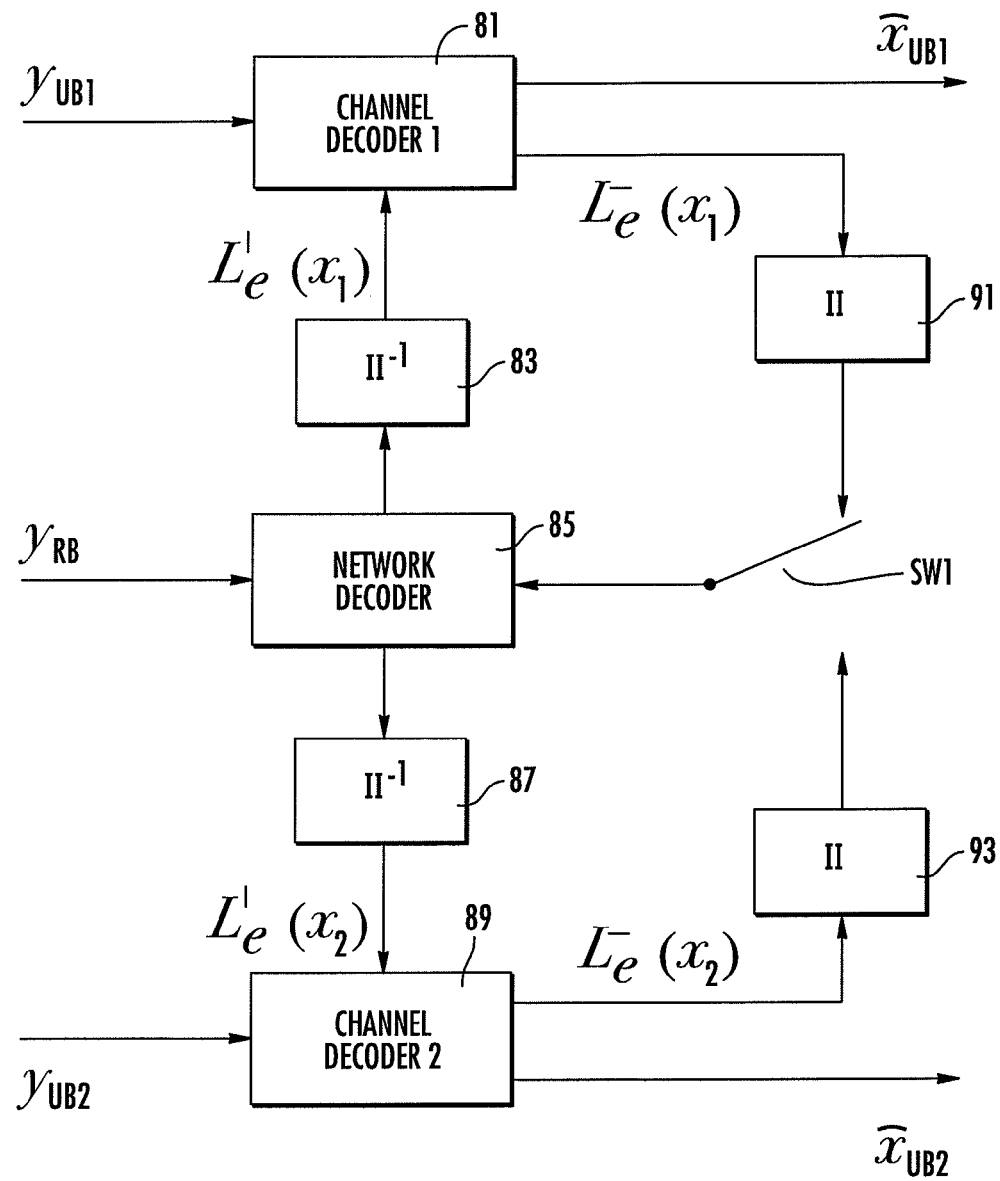
FIG. 7 depicts the iterative decoding of the base station receiving signals from the UEs and the relay station.

At the network entity, typically a base station BS, the structure of the decoder is the same as FIG. 7, but using the embodiments of the invention, the work mode is different. Again, the iterative network and channel decoding is performed at the BS. Two SISO Turbo channel decoders and one SISO RSC network decoder are included. First, channel decoders calculate extrinsic information $L_e^-(u_i)$, i=1, 2 of user i using channel output $y_{UBi}$. A value of zero is included for the punctured bits $P_{UP}$ before decoding starts. $L_e^-(u_i)$ includes extrinsic information of both systematic bits and all the parity bits.

The LLRs $L_e^-(u_i)$ of $P_{UP}$ are mixed and interleaved in the same way as it does in the network encoder at relay node. The LLRs after the mixture are a priori knowledge for the network decoder. For the network decoder at BS, because $S_R$ is the estimated, mixed and interleaved version of $\hat{P}_{UP}$, there is no signal about $\hat{P}_{UP}$ (i.e. $S_R$) received from UEs directly. Therefore channel output signal is unavailable for the network decoder and only a priori knowledge $L_e^-(u_i)$, i=1, 2 obtained from the two channel decoders could be utilized.

The network decoder obtains additional information about its own parity bits $P_R$ from channel output $y_{RB}$. It calculates extrinsic information $L_e^|(u_i)$, i=1, 2 about $S_R$ (also as $\hat{P}_{UP}$ which is fed back to the channel decoders after de-interleaver and de-mixture. After several iterations, the channel decoder can combine almost all the available information to obtain the estimates $\hat{x}_{UBi}$, i=1, 2.

To illustrate the performance characteristics of a system implemented with the embodiments described above, FIGS. 10 and 11 are provided. A simulation was performed using 4 schemes for two sets of conditions. The first scheme, scheme 1, is the JNCC scheme of the paper described above. The second scheme, scheme 2, is the system implemented using embodiments of the present invention described here. A third scheme was simulated where the UEs adopt a turbo channel code but there is no network coding at the relay. The relay only estimates the punctured parity bits and then forwards them to the base station. This third scheme can be considered as simply two separate distributed turbo codes in which relay node works in DF (Decode-and-Forward) mode. The last scheme, scheme 4, is a scheme where both the UEs and the relay station adopt turbo coding as the channel code and as the network code, respectively. In the relay, the newly generated parity bits are transmitted to the base station.

Figure 10:
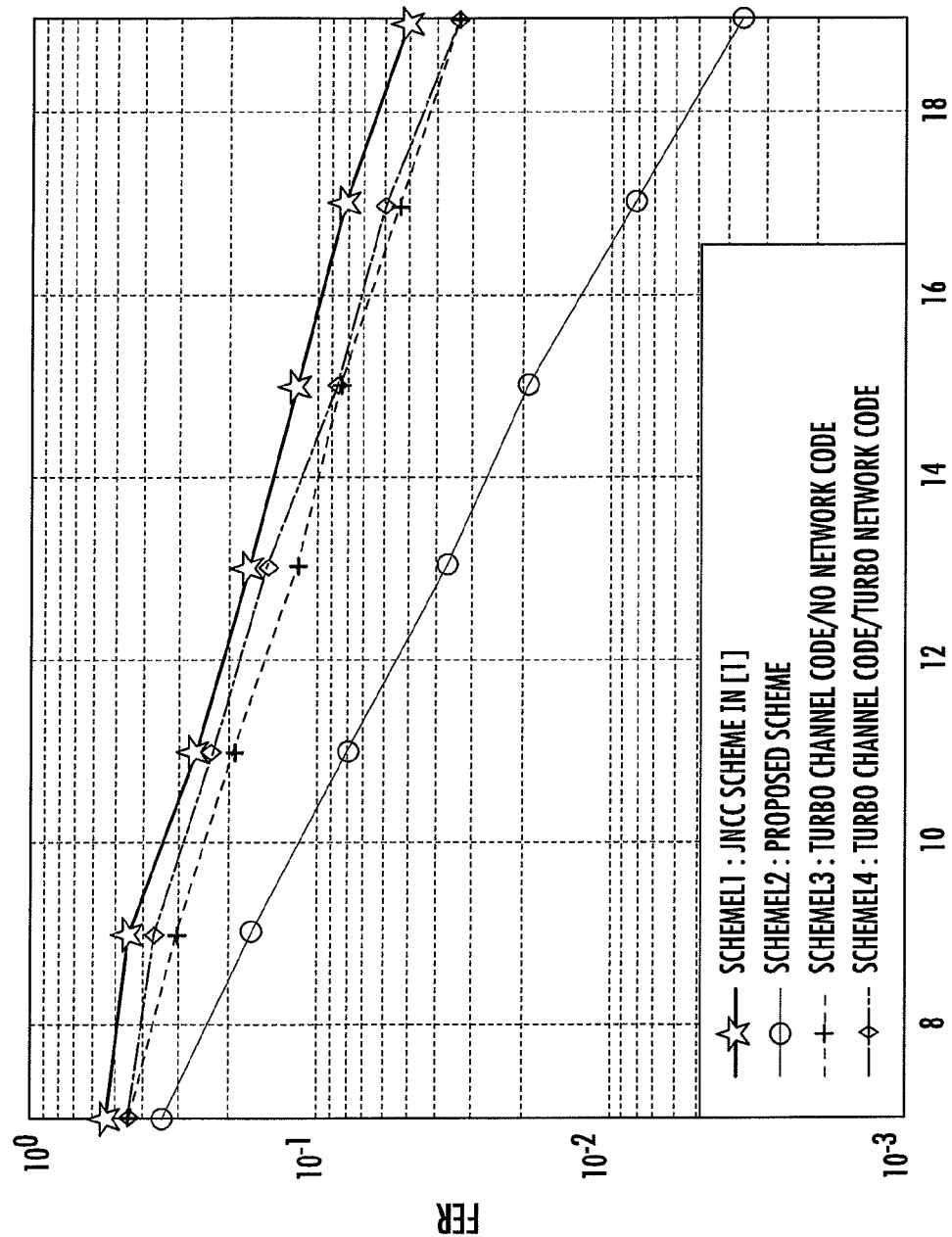
FIG. 10 illustrates in a comparison graph the performance of the embodiments of the present invention compared to other approaches in a first simulation.

In FIG. 10, the simulation illustrates a case where the path loss from the UEs to the relay is the same as from the UEs to the BS (the direct link). The path loss from the relay to the BS is 3 dB more than that of the direct link.

Figure 11:
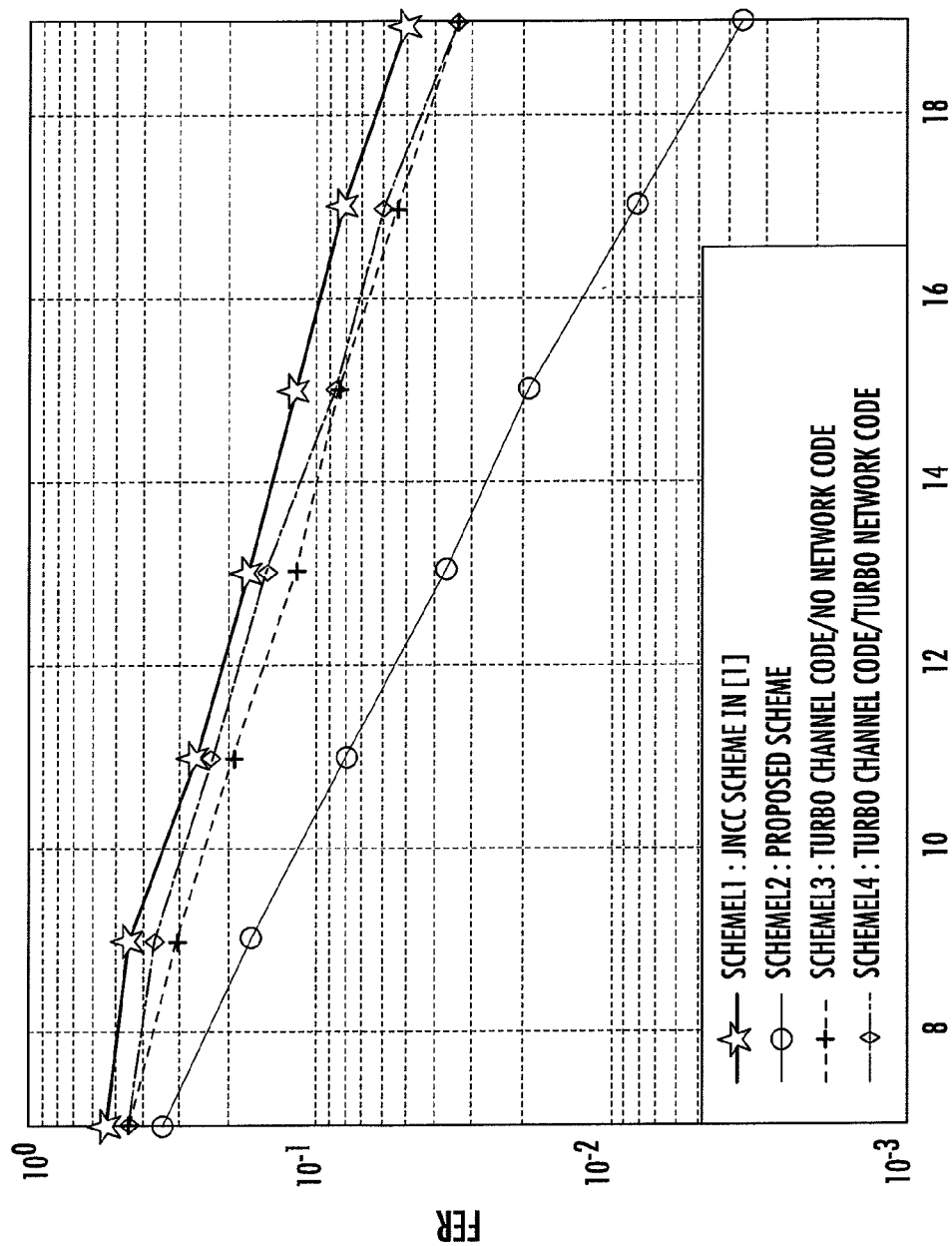
FIG. 11 illustrates in a comparison graph the performance of the embodiments of the present invention compared to other approaches in a second simulation.

In FIG. 11, the simulation depicts the results when the path loss from the UE to the relay is 3 dB more than from the UE to the base station. The path loss from the relay station to the base station is 10 dB more than that of the direct link. TABLE 1 shows the simulation parameters:

TABLE 1

Table. 1 Simulation parameters

| | | |
|---|---|---|
| Channel coding in UEs | Scheme 1 | ⅔ RSC code, code length 1500 |
| | Scheme 2, 3, 4 | ⅔ turbo code, code length 1500 |
| Network coding in relay | Scheme 1, 2 | ½ conventional code; code length 3000, only parity bits are transmitted. |
| | Scheme 3 | No coding |
| | Scheme 4 | ½ turbo code, code length 3000, only parity bits are transmitted. |
| $g_{URi} - g_{UBi}$ | FIG. 10 | 0 dB |
| | FIG. 11 | 3 dB |
| $g_{RB} - g_{UBi}$ | FIG. 10 | 3 dB |
| | FIG. 11 | 10 dB |
| Iteration number in turbo channel decoding | | 6 |
| Iteration number in conventional network decoding | | 6 |

In both FIGS. 10 and 11, the simulation results obtained show that the embodiments presented here perform better than either the JNCC scheme of the prior art paper, and the other two schemes considered here. FIGS. 10 and 11 depict, for each of the four schemes simulated, the frame error rate ("FER") on the Y or vertical axis, plotted against the SNR (signal to noise ratio) on the X or horizontal axis. As can be seen from FIGS. 10 and 11, the proposed scheme of the embodiments described here provides a lower FER for each SNR point observed, and as the SNR gets higher (good conditions), the FER performance exceeds that of the other three schemes obviously.

Figure 12:
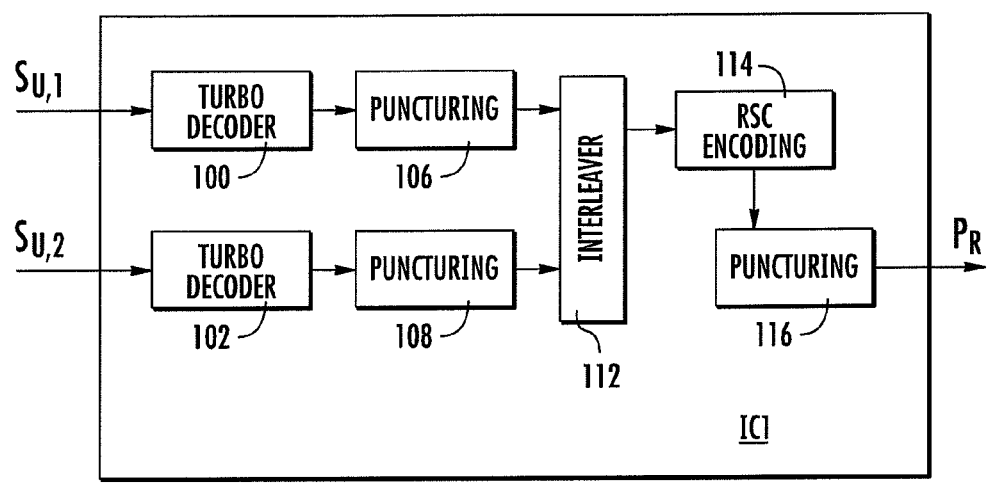
FIG. 12 depicts an embodiment of an integrated circuit having certain functional blocks for performing methods of the invention.

FIG. 12 depicts an embodiment of a relay station where the turbo decoder, puncturing, interleaver and RSC encoding functions of FIG. 9 are implemented in an exemplary integrated circuit. IC1 in FIG. 12 receives two inputs of systematic bits $S_{U,1}$ and $S_{U,2}$ from two transmitters. The IC1 performs the same operations as the relay station in FIG. 9 and outputs parity bits $P_R$. IC1 may be implemented using known ASIC, semicustom, or custom integrated circuit design tools, an integrated circuit that implements these functions can be created, and in another alternative embodiment, these circuits can also be integrated with additional functions such as transceivers, filters, and analog front ends to make a single chip solution for a relay station or UE including a relay function.

Programmable devices such as digital signal processors (DSPs) or microprocessors could be used and software may be written to implement the turbo decoders 100, 102, the puncturing functions 106, 108, the interleaver 112, the RSC encoding function 114, and the final puncturing function 116, of FIG. 12. The software may be stored on a computer readable storage medium for execution by a processor; for example, a flash drive, DVD, CD or other storage device may store the executable instructions to perform the functions of FIG. 9, or 12.

As shown in FIG. 12, the IC has two turbo decoders 100, 102 and these are representative. In a real system the IC may have many turbo decoders, or, only one that is time multiplexed to decode all received signals from a plurality of UEs transmitting signals at the same time. So FIG. 12 is a simplified block diagram but does not limit the embodiments or the scope of the appended claims to two turbo decoders, more, or less, may be used in an implementation of the embodiments.

Embodiments of the present invention can considerably improve system throughput; especially when the data estimates obtained at the relay station are imperfect. Additional punctured parity bits transmitted by the relay station of embodiments of the present invention explore the diversity for the base station to construct a distributed turbo code. Use of RSC network coding makes it possible for two UEs to assist each other, and, optimizes the best possible turbo coding for the base station.

Implementation of the embodiments of the present invention does not incur additional hardware costs, as the RSC decoding and the turbo encoders and decoder are already hardware modules in an existing communications system, thus the embodiments can be realized using the existing hardware modules. For embodiments of the present invention, if 2 turbo decoding and 1 RSC decoding processes are needed within one outer iteration, if the outer iteration number is 15, 8 iterations in one turbo decoding, the total number of RSC decoding processes in this example would be 15*(8*2+1)=255. This compares to 45 times for the JNCC prior art approach.

The exemplary embodiments have been described in the context of a non limiting example with two UEs communicating to a base station and a relay station. In a practical system the number of UEs may be much larger, and multiple relay stations may communicate with a base station. Further, in one example, the relay station may itself be a UE that has available battery and processing resources, e.g. is in idle mode. In alternative embodiments, the relay station may be a dedicated hardware resource implemented particularly for a relay station.

The embodiments are described as methods and steps and using block diagrams. Those skilled in the art will recognize that these functions can be implemented as hardware, as software, by programming existing integrated circuits, by implementing dedicated or custom integrated circuits, by using EEPROM, flash or other programmable circuits or by programming commercially available devices such as DSPs, RISC machines, ARM, CISC or microprocessor or microcontroller devices, to perform the steps of the methods of the embodiments. All of these possible implementations are contemplated as alternative embodiments that are part of the invention and fall within the scope of the appended claims.

Those skilled in the art will recognize that many obvious modifications to the exemplary embodiments may be made while still using the disclosed inventions. For example, some of the terms used in the foregoing and the appended claims are chosen with regards to the presently used terms in the relevant art and being used in draft standards presently in work; changes in these terms and abbreviations over time by use in industry and in standard drafting are contemplated and do not change the scope of the inventions disclosed nor limit the scope of the appended claims These modifications are contemplated as additional embodiments, are considered as within the scope of the invention and fall within the scope of the appended claims.

What is claimed is:

1. An apparatus, comprising: a first receiver for receiving first signals transmitted in a first error correcting code format, the signals including encoded systematic symbols and parity symbols; a second receiver for receiving second signals transmitted in the first error correcting code format, the second signals including encoded systematic symbols and parity symbols; a first decoder for decoding the received first signals; a second decoder for decoding the received second signals; an interleaver for forming an interleaved signal from the an encoder for encoding the interleaved signal into an encoded signal in a second error correcting code format; a puncturing operation for determining parity signals representing parity symbols from the encoded signal; and a transmitter for transmitting the parity signals in the second error correcting code format.

2. The apparatus of claim 1 and further comprising: a transceiver for receiving and transmitting spread spectrum radio frequency communication signals to and from a network element over an air interface using coded signals.

3. The apparatus of claim 1, wherein the first and second receivers receive spread spectrum radio frequency signals over an air interface.

4. The apparatus of claim 1 wherein the transmission of the parity signals comprises transmitting the parity symbols as spread spectrum radio frequency signals over an air interface.

5. The apparatus of claim 1 wherein the apparatus is part of user equipment for cellular communications.

6. The apparatus of claim 1 wherein the apparatus is part of a cell phone.

7. The apparatus of claim 1 wherein the first error correcting code is a turbo code.

8. The apparatus of claim 1 wherein the first and second decoders are turbo code decoders.

9. The apparatus of claim 1 wherein the second error correcting code is a recursive systematic convolutional (RSC) code.

10. The apparatus of claim 1 wherein the encoder is an RSC encoder.

11. An integrated circuit comprising: a first receiver for receiving first transmitted signals in a first error correcting code format; a second receiver for receiving second transmitted signals in the first error correcting code format; a first decoder for decoding the first transmitted signals to form a first decoded signal; a second decoder for decoding the second transmitted signals to form a second decoded signal; an interleaver for interleaving the first and second decoded signals to form an interleaved signal; an encoder for encoding the interleaved signal in a second error correcting code format to form an encoded signal; a puncturing block for puncturing the encoded signal; and a parity generator for determining parity bits in the encoded signal to facilitate outputting the parity bits of the encoded signal in the second error correcting code format.

12. The integrated circuit of claim 11 and further comprising additional circuitry to form a radio frequency user equipment circuit.

13. The integrated circuit of claim 11 wherein first and second receivers are implemented as a time multiplexed operation in a single receiver.

14. An apparatus, comprising:
a programmable device, said programmable device being software configurable; and
a computer readable storage medium storing computer program instructions, which when executed by the programmable device, are configured to cause the apparatus to:
receive one or more first signals transmitted in a first error correcting code format, the first signals including encoded systematic symbols and parity symbols;
receive one or more second signals transmitted in the first error correcting code format, the second signals including encoded systematic symbols and parity symbols;
decode the received first signals;
decode the received second signals;
form an interleaved signal from the first and second decoded received signals;

encode the interleaved signal into an encoded signal in a second error correcting code format;

perform puncturing for determining parity signals representing parity symbols from the encoded signal; and cause transmission of the parity signals in the second error correcting code format.

15. The apparatus of claim 14 wherein the first error correcting code format is a turbo code.

16. The apparatus of claim 14 wherein the second error correcting code format is a recursive systematic convolutional (RSC) code.

* * * * *

UNITED STATES PATENT AND TRADEMARK OFFICE
CERTIFICATE OF CORRECTION

PATENT NO. : 8,281,211 B2  
APPLICATION NO. : 12/121631  
DATED : October 2, 2012  
INVENTOR(S) : Wang et al.

Page 1 of 1

It is certified that error appears in the above-identified patent and that said Letters Patent is hereby corrected as shown below:

In the Claims:

Column 15,
Line 67, "the an encoder" should read --the first and second decoded received signals; an encoder--.

Signed and Sealed this
Fourth Day of June, 2013

Teresa Stanek Rea
*Acting Director of the United States Patent and Trademark Office*